United States Patent

[11] 3,554,138

[72] Inventor Robert Taylor Glass
 415 W. 6th St., Austin, Tex. 78701
[21] Appl. No. 758,320
[22] Filed Sept. 9, 1968
[45] Patented Jan. 12, 1971

[54] STICK CONVEYOR AND INSERTER FOR FROZEN CONFECTIONS
 14 Claims, 11 Drawing Figs.
[52] U.S. Cl. .................................................... 107/70
[51] Int. Cl. .................................................... A23g 5/02
[50] Field of Search............................................ 107/8, 8.1, 70

[56] References Cited
UNITED STATES PATENTS
| | | | |
|---|---|---|---|
| 1,487,788 | 3/1924 | Lombardo................... | 107/8.1 |
| 1,550,070 | 8/1925 | Goss............................ | 107/8.1 |
| 1,507,167 | 9/1924 | Gigliotti ...................... | 107/8.1 |

Primary Examiner—Laverne D. Geiger
Assistant Examiner—Robert I. Smith
Attorney—Beale and Jones ABSTRACT: There is a drum disposed on a horizontal axis that has spaced apart transverse recesses therein to receive and transport sticks for confections. There are two spaced apart annular grooves in the drum and the drum has a portion thereof that exposes its circumference to rotation within a hopper where sticks are picked up in the transverse recesses. There are throwout fingers which ride in the annular grooves below the bottoms of the transverse recesses in an in position and in an out position. They intersect the recesses thereby in the latter position preventing sticks to enter and be carried by the transverse recesses. The drum discharges the sticks onto a generally horizontal tray that extends generally tangentially adjacent the uppermost portion of the drum. There are feelers associated with the entrance of the tray that extend into the annular grooves in the drum to strip off the sticks from the drum and guide them onto the tray. The sticks are pushed along the tray abutting each other and guided under a top hold down leaf spring or top guide member. An endless belt conveyor picks up the sticks from the discharge end of the tray. A first detector associated with the endless conveyor senses the presence of sticks on the conveyor and causes a solenoid to move the throwout fingers to out position whereupon they prevent sticks from entering the transverse recesses in the drum. A second detector along the conveyor belt senses the absence of sticks on the conveyor belt and causes the throwout fingers under the influence of their solenoid operator to move to the in position in the annular grooves in the drum and the pick up of sticks by the drum resumes. The endless conveyor discharges to a stick inserter that moves the sticks endwise in succession at the discharge station. There is a pusher that rocks and moves each successive stick endwise between a pair of continuously running knurled rolls. These move a stick endwise into a holding clamp and the next stick moved by the rolls pushes the head stick into a partially frozen and formed confection as it leaves an extruder head where it is chopped off as by a hot wire. The hot wire is timed to operate with the conveyor and a cam on the operating shaft that rotates the hot wire closes a microswitch to a solenoid that rocks the pusher arm moving each stick in succession off of the conveyor and between the continuously running feed rolls.

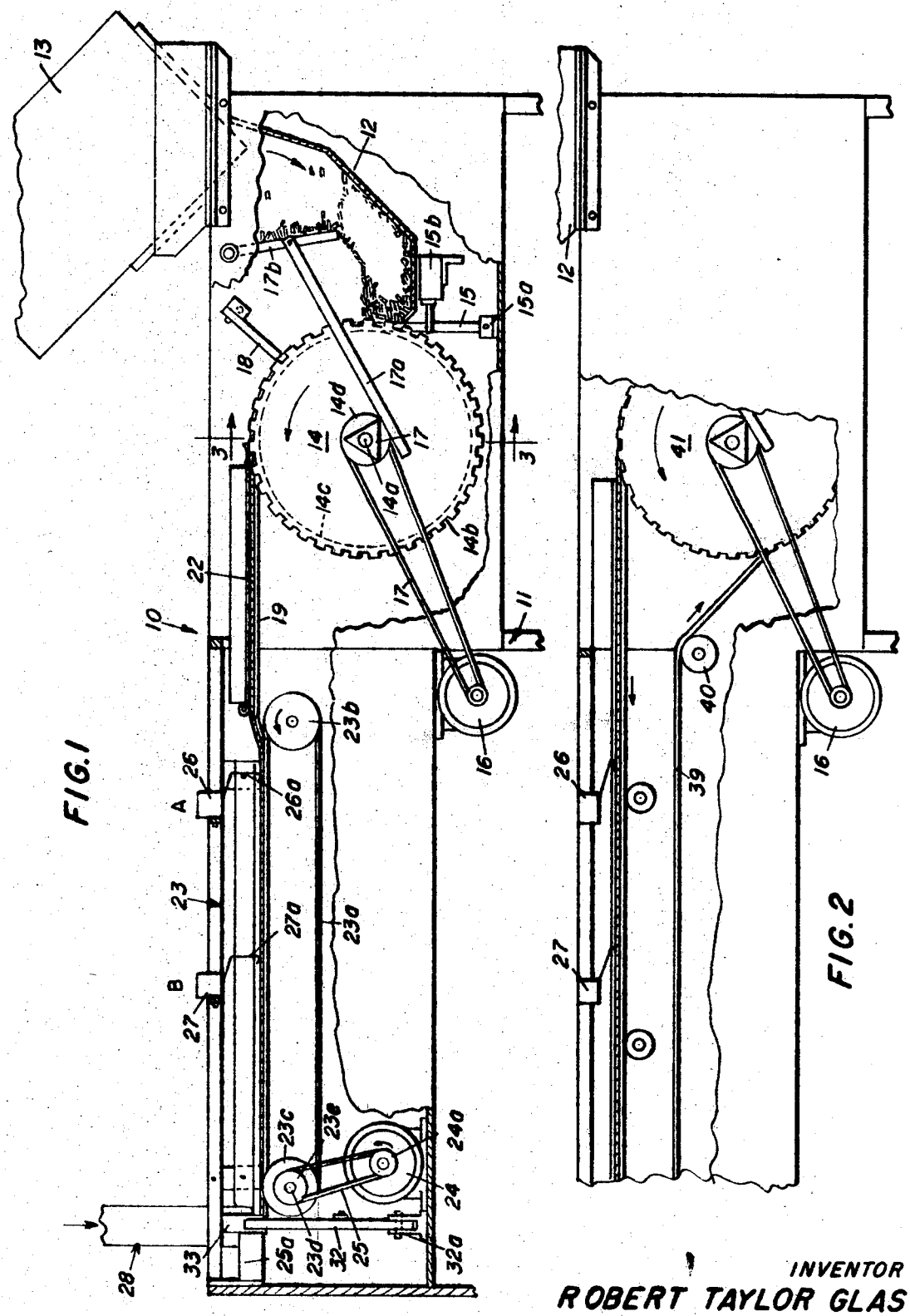

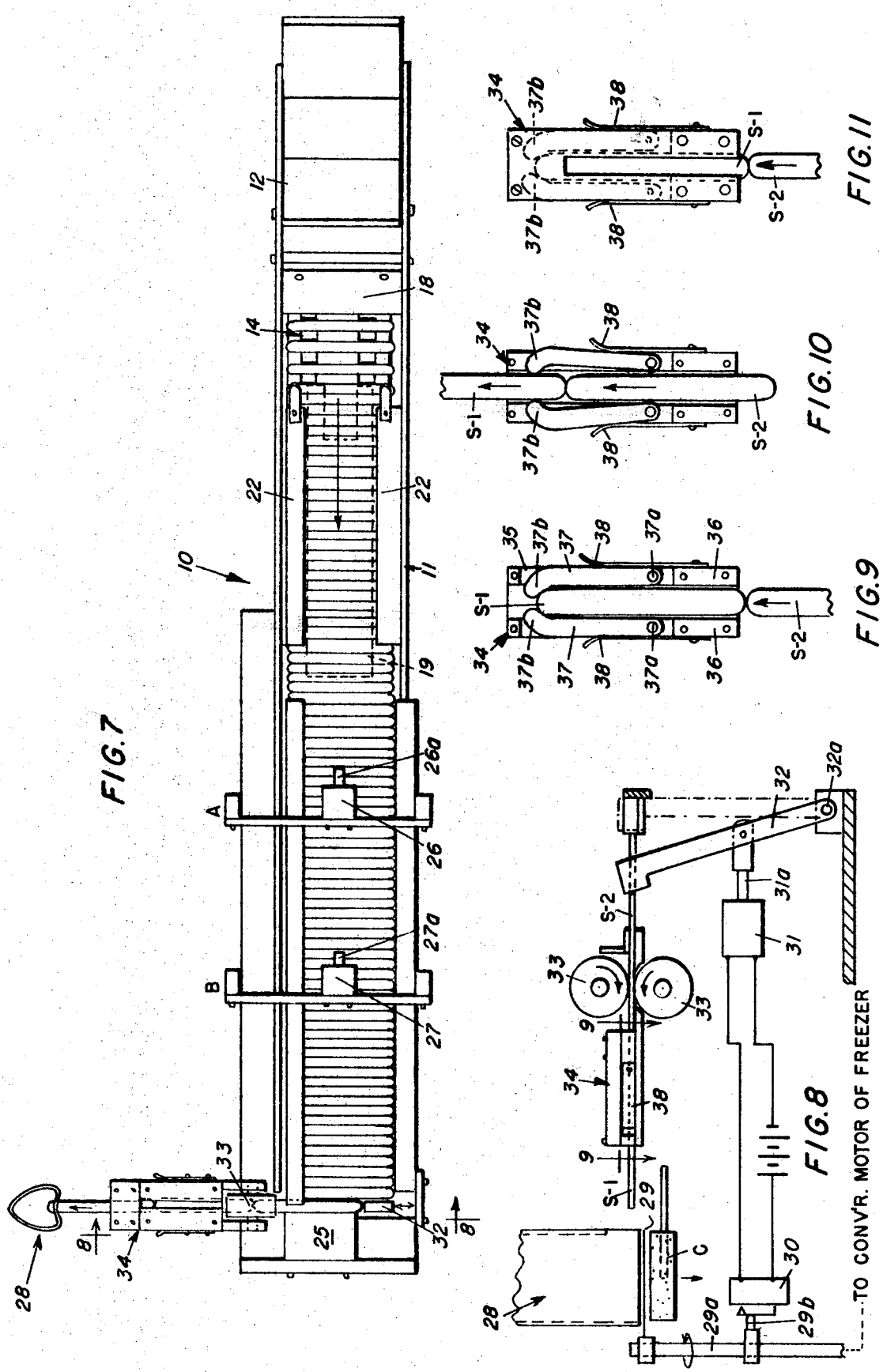

STICK CONVEYOR AND INSERTER FOR FROZEN CONFECTIONS

An alternative construction is to omit the tray that transfers the sticks from the pick up drum to the endless conveyor. In this case, the endless belt is lead about the drum within the annular groove or grooves provided. The throwout fingers ride in part of the grooves and outside the belts so as to move out and across the transverse recesses to prevent stick entry when it is desired to not pick up sticks. Otherwise, the surface of the belt is even with or below the bottom of the transverse recesses and allows the sticks to be picked up in the recesses. The upper run of the belt or belts leaving the annular grooves of the drum carries away the sticks from the drum.

This stick conveyor and inserter provides for the use of bulk sticks and their feed to an inserter station. At the inserter station the sticks are inserted into ice cream confections of odd shapes that are extruded in semifrozen state, before final freezing, instead of being molded. These odd shapes, such as a heart shape, club shape, etc. cannot be practically molded in an automatic continuous process, so they must be extruded.

For a more complete understanding of the nature and scope of the invention reference is had to the drawings and the description which follows. In the drawings, FIG. 1 is a side elevation of the stick conveyor and inserter;

FIG. 2 is a fragmentary side elevation of a modification;

FIG. 7 is a general top plan view of FIG. 1;

FIG. 8 is a sectional view along line 8–8 of FIG. 7 on an enlarged scale;

FIG. 9 is a top plan view of the spring pressed stops holding a stick and a succeeding pusher stick therebehind;

FIG. 10 is like FIG. 9 with the advance stick being pushed from the spring pressed stops into a confection; and fig. 11 is a bottom view of FIG. 9.

Throughout the description like reference numbers refer to similar parts.

The apparatus includes the following major components:
1. A storage hopper for storing a supply of sticks.
2. A slotted drum or wheel for picking up the sticks from the hopper.
3. A conveyor to transfer the sticks to the place of insertion.
4. An insertion mechanism to insert the stick into partially frozen ice cream.
5. A means of maintaining a full, but not overfull conveyor so that a stick is always ready for insertion.
6. A means of timing the sticking operation to the machine.

The stick feeder and inserter machine is generally indicated at 10 in FIGS. 1 and 7.

Figure 3:
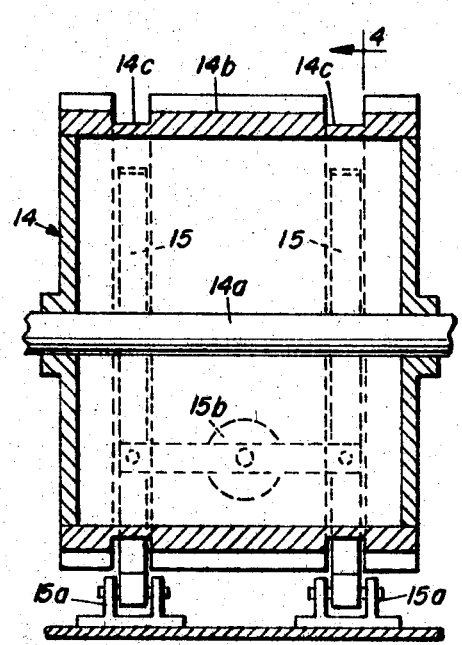
FIG. 3 is a sectional view along line 3–3 of FIG. 1 of the feed drum or wheel on a slightly enlarged scale.

An angle iron framework with support plates is generally indicated at 11 to support the various components. A hopper 12 receives sticks from a bulk container 13 with the sticks oriented parallel to each other. In running in the hopper 12 is a stick pickup drum or wheel 14 rotated on a horizontal shaft 14a having equally spaced apart transverse stick receiving recesses 14b in its peripheral surface. The drum 14 has two spaced apart annular grooves 14c, see FIG. 3, whose bottoms are spaced below the bottoms of the recesses 14b. These annular grooves 14c receive throwout fingers 15 that are pivotally mounted at 15a below the hopper 12 and extend around a portion of the periphery of the drum exposed in the hopper. The fingers 15 in the in position in the grooves 14c have their outer surfaces below the bottom of the stick recesses 14b and permit sticks to be picked up in the recesses. In the out position of the throwout fingers 15, the fingers intersect the transverse recesses and prevent the pickup of sticks. A solenoid 15b rocks the throwout fingers and its operation will be explained later.

A constant speed continuously running motor 16 has a drive pulley 16a driving a belt 17 passing over a pulley 14d on the drum shaft 14a. A triangular plate member 17 on shaft 14a moves an arm 17a rigidly connected to a pivotally mounted agitator arm 17b in the stick hopper 12. This arm 17b agitates the sticks and causes them to move downwardly to the feed drum 14.

The sticks are picked up in the transverse recesses 14b in the drum 14 and pass under a bar 18 that limits one stick to a recess.

Figure 4:
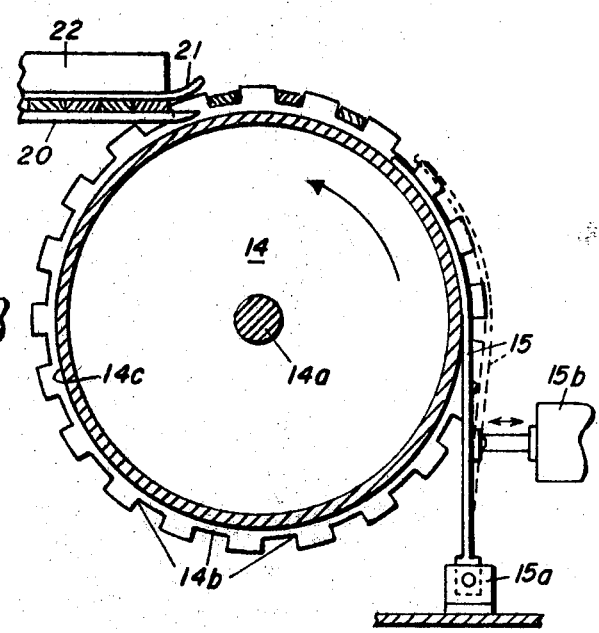
FIG. 4 is a sectional view along line 4–4 of FIG. 3.

A horizontally disposed tray 19 extends generally tangentially to the top of the drum 14 and receives the sticks in side by side relation. Feelers 20, see FIG. 4, extend from the end of the entrance of the tray into the annular grooves 14c in the drum and below the transverse recesses 14b so that the sticks ride on top of the feelers onto the tray 19. Spring clips 21, see FIG. 4, are mounted spaced above the feelers 20 and assist in the movement of the sticks onto the tray 19. Hold down bars 22 are positioned above the ends of the sticks on the tray.

An endless belt conveyor is generally indicated at 23. It is horizontally disposed in the framework and has an endless belt 23a that passes over an idler pulley 23b at its stick receiving end at the discharge end of tray 19. It passes over a drive pulley 23c on drive shaft 23d at its stick delivery end. A constant speed continuous motor 24 having a drive pulley 24a drives a belt 25 that passes over a drive pulley 23e on conveyor drive shaft 23d.

The sticks are moved along the tray 19 by one pushing against another and are deposited on endless conveyor belt 23a. The sticks are moved along the conveyor belt 23a to the end where their motion is stopped by horizontal stop 25 where they wait to be moved in a direction 90° to their previous movement, to be inserted into the ice cream confection.

The solenoid 15b controlling the in and out positioning of the throwout finger 15 is under the control of limit switches operated by feelers along the conveyor 23.

When the conveyor belt 23a is full of sticks to the point A, the sticks actuate a feeler 26a for limit switch 26 which is in a power circuit (not shown) with solenoid 15b. Solenoid 15b moves the throwout finger 15 to out position to partially fill the transverse recesses 14b so that no more sticks can be picked up and transferred to the conveyor 23.

As the conveyor belt 23a runs and the last stick of the supply of sticks on it moves past point B, feeler 27a actuates limit switch 27 also in the power circuit (not shown) to the solenoid 15b. The absence of a stick at B is sensed by the limit switch 27 and solenoid 15b is actuated to move the throwout fingers 15 into the annular grooves 14c in the drum so more sticks may be picked up and transferred to the conveyor 23 until it is full to point A.

There is an extruder for the ice cream confection generally indicated at 28. A hot wire cutter or chopper 29 affixed to the top end of vertical shaft 29a, see FIG. 8, rotates past the end of extruder 28 and severs or chops off an extruded ice cream confection C. The shaft 29a is driven by a shaft from the freezing conveyor of the associated machine.

On shaft 29a there is affixed a cam 29b whose lobe at the time of the hot wire cutting actuates a microswitch 30 in circuit with a solenoid 31. Solenoid 31 has its armature rod 31a pivotally connected to a pivoted rocker arm or stick pusher 32 pivotally mounted at 32a. The upper end of rocker arm 32 has a pusher head that pushes the end stick S–2 that is adjacent stop 25 in between two constantly in-running knurled surface rolls 33–3. The stick is very rapidly pushed toward the ice cream confection that is being extruded from the extruder 28. Stick S–2 pushes previously pushed stick S–1 into the confection C. The action is fast enough that there is very little lack of perpendicularity between the inserted stick and the confection C.

The momentum and movement of stick S–2 is stopped by spring loaded stops generally indicated at 34. It has passed between rolls 33–33 and has no means of receiving endwise forward motion until another stick is pushed between the constantly running rolls 33–33.

The stops 34 are made up of a bed plate 35 on whose top is mounted spaced apart guide bars 36 at the entrance end. Pivotally mounted stops 37 are mounted on the bed plate 35 pivot pins 37a at the ends of the guide bars 36. The ends of the stops are curved in at 37b so as to stop the curved end of the stick. Each pivoted stop 37 is spring pressed inwardly towards the stick by leaf springs 38 secured to the bars 36.

Figure 5:
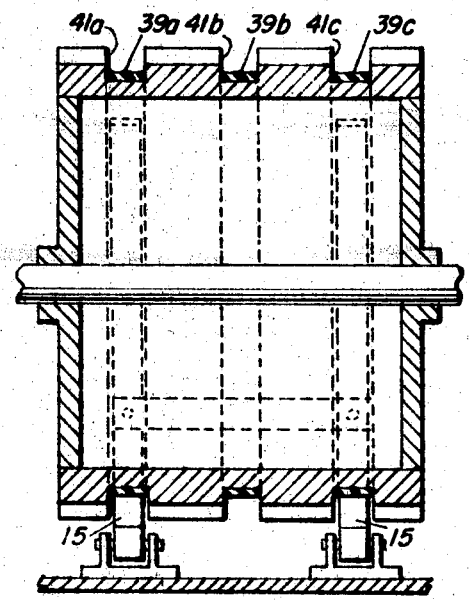
FIG. 5 is a cross sectional view similar to FIG. 3 of a modification such as FIG. 2 showing three belts.
Figure 6:
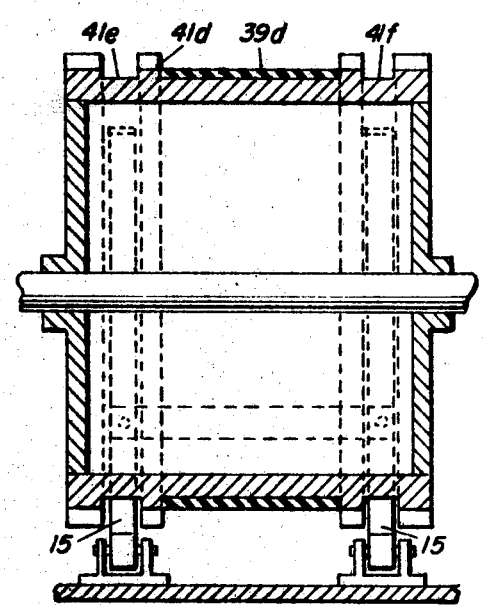
FIG. 6 is a cross-sectional view like FIG. 5 of a modification showing one belt.

In FIGS. 2, 5 and 6 there is illustrated a modification. Here an endless conveyor belt 39 passes over an idler pulley 40 on its lower run. From the idler pulley the belt 39 passes to the stick pick up drum 41 where it, as shown in the three belt type in FIG. 5 or one belt type in FIG. 6, as examples, rides in appropriate annular grooves in the drum 41. In FIG. 5 the three belts 39a, 39b, 39c ride in grooves 41a, 41b, 41c. In FIG. 6a single belt type 39d rides in annular groove 41d. In each case as before the annular grooves are below the transverse recesses in the drum that receives the sticks. There are throwoff fingers 15 as before arranged in a part of the grooves and outside the belts therein as for FIG. 5 so as to move out and across the transverse recesses to prevent stick entry.

In FIG. 6, the annular grooves that receive the throwout fingers 15 ride in separate grooves 41e and 41f to each side of the belt groove 41d.

While limit switches 26 and 27 with their feelers are shown and described, other proximity sensing devices could be used such as photoelectric cells.

There is here provided a positive acting stick feeder for bulk sticks to provide a constant supply to a stick inserter. The stick inserter operates in timed relation with the conveyor as does the hot wire cutter or chopper that is synchronized to cut off an extruded confection as a stick is being inserted. The confection with stick inserted drops onto a conveyor of a freezer for further freezing.

I claim:

1. A stick feeder and inserter for frozen confections comprising in combination:

a hopper for receiving a supply of sticks;

a drum having a portion of the surface rotating in said hopper and having transverse stick receiving recesses in the surface thereof, at least one annular groove in the circumferential surface in communication with and crossing the transverse recesses;

a throwout finger movably mounted and riding in said annular groove in the drum and means connected with the finger to move it with respect to said transverse recesses to selectively permit sticks to enter the transverse recesses and prevent sticks from entering said transverse recesses;

a conveyor means cooperating with said drum and receiving sticks transferred from the drum in side by side relation extending transversely of said conveyor means;

a detection means for sticks along said conveyor means and operably connected with said means for moving the throwout finger whereby absence of sticks causes said throwout finger means to move the finger into its annular groove and the presence of sticks causes said means to move the throwout finger across said transverse recesses to prevent entrance of sticks therein whereby a supply of sticks is maintained on said conveyor means; and means adjacent the delivery end of the conveyor means to move the sticks successively transverse to the conveyor and into a frozen confection adjacent the conveyor means.

2. A stick feeder and inserter for frozen confections according to claim 1 wherein the detection means for the sticks adjacent said conveyor means comprises a first detector and a second detector spaced further along in the line of travel of said sticks on the conveyor:

said first detector detecting the presence of sticks and operably connected to said means moving said throwout finger whereby the finger is moved to partially fill the transverse recesses in the drum and no sticks are picked up by the drum;

said second detector detecting the absence of sticks and operably connected to said means moving said throwout finger whereby the finger is moved into its groove and from obstructing the transverse recesses and sticks are again picked up and fed to the conveyor means by the drum; and said first finger on again detecting the presence of sticks on the conveyor means causes said means moving said throwout finger to again move into said transverse recesses preventing sticks being picked up by the drum.

3. A stick feeder and inserter for frozen confections according to claim 1 including agitator means in the hopper urging said sticks into engagement with said transverse recesses in the drum.

4. A stick feeder and inserter for frozen confections according to claim 1 wherein said conveyor means includes a tray at the discharge of said drum upon which the sticks are received and pushed along side by side by the rearmost stick and an endless belt conveyor at the discharge end of said tray to receive said sticks.

5. A stick feeder and inserter for frozen confections according to claim 4 wherein said tray includes a feeder member extending at the entrance end of the tray into said annular groove in the drum to guide the sticks onto said tray.

6. A stick feeder and inserter for frozen confections according to claim 5 including spring means over the sticks on said tray holding said sticks in side by side alignment on said tray.

7. A stick feeder and inserter for frozen confections comprising in combination:

a hopper for receiving a supply of sticks;

a drum having its axis extending horizontally and having a portion of the surface rotating in said hopper and having in its circumferential surface spaced apart transversely extending stick receiving recesses, at least one annular groove in the circumferential surface in communication with and crossing said transverse recesses;

a throwout finger means movably mounted and riding in a portion of said annular groove in the drum and means connected with the finger to move it in the groove with respect to said transverse recesses to selectively permit sticks to enter the transverse recesses as well as prevent sticks from entering the recesses;

an endless conveyor means having its belt at one end riding in said groove in the drum and radially beneath the surface of the transverse recesses and the sticks picked up therein;

said endless belt carrying off said sticks thereon as it leaves the drum on its top run; and a detection means for sticks along said conveyor means and operably connected with said means for moving the throwout finger whereby absence of sticks causes said throwout finger means to move the finger into its annular groove portion and the presence of sticks causes said means to move the throwout finger across said transverse recesses in the drum to prevent receipt of sticks therein whereby a supply of sticks is maintained on said endless conveyor means.

8. Apparatus according to claim 7 including means adjacent the delivery end of the endless conveyor means to move the sticks successively transverse to the conveyor and into a frozen confection adjacent the conveyor belt means.

9. An apparatus according to claim 7 wherein the detection means for the sticks adjacent said conveyor means comprises a first detector and a second detector spaced further along in the line of travel of said sticks on the conveyor:

said first detector detecting the presence of sticks and operably connected to said means moving said throwout finger whereby the finger is moved to partially fill the transverse recesses in the drum and no sticks are picked up by the drum;

said second detector detecting the absence of sticks and operably connected to said means moving said throwout finger whereby the finger is moved into its groove and from obstructing the transverse recesses and sticks are again picked up and fed to the conveyor means by the drum; and said first finger on again detecting the presence of sticks on the conveyor means causes said means moving said throwout finger to again move into said transverse recesses preventing sticks being picked up by the drum.

10. An apparatus according to claim 7 wherein the drum has a separate annular groove within which the belt runs and a pair of annular grooves for the throwout finger, one of each disposed to the side of groove carrying the belt.

11. A stick feeder and inserter for frozen confections comprising in combination:

a hopper for receiving a supply of sticks;

a drum having a portion of the surface rotating in said hopper and having transverse stick receiving recesses in the surface thereof, at least one annular groove in the circumferential surface in communication with and crossing the transverse recesses;

a throwout finger movably mounted and riding in said annular groove in the drum and means connected with the finger to move it with respect to said transverse recesses to selectively permit sticks to enter the transverse recesses and prevent sticks from entering said transverse recesses;

a conveyor means cooperating with said drum and receiving sticks transferred from the drum in side by side relation extending transversely of said conveyor means; and a detection means for sticks along said conveyor means and operably connected with said means for moving the throwout finger whereby absence of sticks causes said throwout finger means to move the finger into its annular groove and the presence of sticks causes said means to move the throwout finger across said transverse recesses to prevent entrance of sticks therein whereby a supply of sticks is maintained on said conveyor means.

12. In combination with a continuously running conveyor carrying elongated sticks in side by side relation thereon to a stop position, a stick inserter for moving each successive stick endwise into a confection while simultaneously being extruded and severed, said stick inserter having:

a pair of in-running high speed rolls continuously driven;

a rocker arm pusher adjacent said conveyor at the stopped position of the stick pushing each stick arriving at said stop position;

means rocking said arm in timed relation with the severing and extruding of said confection;

said rocker arm pushing each successive stick in between said in-running rolls;

a spring-loaded stop receiving each stick moved on by said rolls;

said spring-loaded stop having a guide between which said stick is received and moves, a pair of pivotally mounted spaced apart stop arms adjacent said guide in the direction of movement of the stick, said stop arms having inturned ends opposite their pivoted ends against which said stick end is stopped and springs urging each stop arm pivoted towards each other; and whereby on pushing of a first stick between said rolls, said first stick is moved between the rolls and arrested in said spring-loaded stop between said pivoted stops, a second stick on being pushed by said rocker arm pusher, pushes said first stick in a shooting manner into said confection being extruded and severed.

13. Apparatus according to claim 12 including rotating severing means for severing the extruded confection, said severing means having movable mounting means moved in timed relation with said conveyor:

said means rocking said rocker arm pusher including a solenoid actuator attached to said arm, a power source connected through a switch means with said solenoid; and switch actuating means connected with said movable mounting means for said severing means whereby the switch is closed to energize said solenoid and rock said rocker arm pusher as said extruded confection is being severed.

14. Apparatus according to claim 13 wherein said movable mounting means for the severing means is a shaft rotated in timed relation by said conveyor motor, said switch actuating means for the solenoid is a cam mounted on and rotating with said shaft and moving said switch to closed position each time said severing means severs a confection.

UNITED STATES PATENT OFFICE
CERTIFICATE OF CORRECTION

Patent No. 3,554,138      Dated January 12, 1971

Inventor(s) ROBERT TAYLOR GLASS

It is certified that error appears in the above-identified patent and that said Letters Patent are hereby corrected as shown below:

Column 4, line 22, cancel "feeder" and insert --feeler--.

Signed and sealed this 20th day of April 1971.

(SEAL)
Attest:

EDWARD M. FLETCHER, JR.
Attesting Officer

WILLIAM E. SCHUYLER, JR.
Commissioner of Patents